US005956510A

United States Patent [19]

Nicholas

[11] Patent Number: 5,956,510
[45] Date of Patent: Sep. 21, 1999

[54] APPARATUS AND METHOD FOR REVISING COMPUTER PROGRAM CODE

[75] Inventor: Ronald M. Nicholas, Lakeville, Minn.

[73] Assignee: Unisys Corporation, Blue Bell, Pa.

[21] Appl. No.: 08/711,920

[22] Filed: Sep. 10, 1996

[51] Int. Cl.⁶ ........................................ G06F 9/45
[52] U.S. Cl. ..................... 395/701; 395/704; 395/705; 395/707; 395/708; 707/4; 707/101
[58] Field of Search ...................... 395/701, 704, 395/705, 707, 708, 183.14; 707/1–4, 6, 101, 104, 203; 364/280.7, 280.4, 569, 771, 744, 715.07; 341/82–85; 711/170

[56] References Cited

U.S. PATENT DOCUMENTS

| | | | |
|---|---|---|---|
| 5,230,049 | 7/1993 | Chang et al. | 395/708 |
| 5,426,760 | 6/1995 | Moreland | 711/170 |
| 5,600,836 | 2/1997 | Alter | 707/101 |
| 5,630,118 | 5/1997 | Shaughnessy | 707/1 |
| 5,644,762 | 7/1997 | Soeder | 707/6 |

OTHER PUBLICATIONS (No author); The Year 2000 and 2–Digit Dates:A Guide for Planning and Implementation, IBM pp. 3–1, 3–2, 4–4 through 4–7, 7–9, 7–10, 7–20, 7–36, 7–41, 7–46, Oct. 1995.

Hart et al., A Scaleable, Automated Process for Year 2000 System Correction, IEEE, pp. 475–484, Mar. 1996.

*Primary Examiner*—Hal Dodge Wachsman
*Attorney, Agent, or Firm*—John B. Sowell; Mark T. Starr; Steven B. Samuels

[57] ABSTRACT

Apparatus and methods for revising a field in computer program code. One method includes analyzing program code lines for the presence of the field and, if present, selectively revising the field from the first value range to a second value range. The field has a storage attribute of n bits, where n is at least eight bits; with the first value range being inclusively between zero and 99, and the second value range being inclusively between zero and $2^n-1$. The method can further include inserting an extended field representative of a base value into the program code, with the field being encoded as an offset value relative to the extended field. The method also can include creating a program code executable on a computer from the revised computer program code. The present invention also provides a system for revising a computer program file having multiple host language statements, including an analyzer, for identifying a preselected data type the host language statements, and a translator for selectively modifying the preselected data type from the first attribute value range to a second attribute value range. The translator, alone or in combination with the analyzer, can be a code interpreter, a debugger, a code emulator, or a compiler.

12 Claims, 8 Drawing Sheets

```
77 THIS-CENTURY                PIC 9(4) VALUE 1900
77 NEXT-CENTURY                PIC 9(4) VALUE 2000
77 NO-CENTURY                  PIC 9(4) VALUE 0
01 BIRTH-DATE
   03 BD-MONTH                 PIC 99
   03 BD-DAY                   PIC 99
   03 BD-YEAR                  PIC 99
   03 BD-NEWYR REDEFINES BD-YEAR
      PIC YY BASE-CENTURY IS THIS-CENTURY
   03 BD-BASELINEYR REDEFINES BD-YEAR
      PIC YY BASE-CENTURY IS NO-CENTURY
01 RETIRE-DATE
   03 RD-MONTH                 PIC 99
   03 RD-YEAR                  PIC YY
      BASE-CENTURY IS NEXT-CENTURY
```

FIG. 1

| DECIMAL VALUE | BINARY EQUIVALENT | HEX EQUIVALENT | OCTAL EQUIVALENT | PIC YY STORAGE FOR DISPLAY FIELDS | |
|---|---|---|---|---|---|
| | | | | EBCDIC PAIR (HEX CHARS) | ASCII PAIR (8-BIT VALUES) |
| 0 | 00000000 | 00 | 000 | F0 F0 | 48 48 |
| 1 | 00000001 | 01 | 001 | F0 F1 | 48 49 |
| 2 | 00000010 | 02 | 002 | F0 F2 | 48 50 |
| 3 | 00000011 | 03 | 003 | F0 F3 | 48 51 |
| 4 | 00000100 | 04 | 004 | F0 F4 | 48 52 |
| 5 | 00000101 | 05 | 005 | F0 F5 | 48 53 |
| 6 | 00000110 | 06 | 006 | F0 F6 | 48 54 |
| VALUES OMITTED FOR BREVITY | | | | | |
| 94 | 01011110 | 5E | 136 | F9 F4 | 57 52 |
| 95 | 01011111 | 5F | 137 | F9 F5 | 57 53 |
| 96 | 01100000 | 60 | 140 | F9 F6 | 57 54 |
| 97 | 01100001 | 61 | 141 | F9 F7 | 57 55 |
| 98 | 01100010 | 62 | 142 | F9 F8 | 57 56 |
| 99 | 01100011 | 63 | 143 | F9 F9 | 57 57 |

FIG. 2a

| DECIMAL VALUE | BINARY EQUIVALENT | HEX EQUIVALENT | OCTAL EQUIVALENT | PIC YY STORAGE FOR DISPLAY FIELDS | |
|---|---|---|---|---|---|
| | | | | EBCDIC PAIR (HEX CHARS) | ASCII PAIR (8-BIT VALUES) |
| 99 | 01100011 | 63 | 143 | F9 F9 | 57 57 |
| 100 | 01100100 | 64 | 144 | FA 64 | 58 48 |
| 101 | 01100101 | 65 | 145 | FA 65 | 58 49 |
| 102 | 01100110 | 66 | 146 | FA 66 | 58 50 |
| 103 | 01100111 | 67 | 147 | FA 67 | 58 51 |
| VALUES OMITTED FOR BREVITY | | | | | |
| 199 | 11000111 | C7 | 307 | FA C7 | 67 57 |
| 200 | 11001000 | C8 | 310 | FA C8 | 68 48 |
| 201 | 11001001 | C9 | 311 | FA C9 | 68 49 |
| 202 | 11001010 | CA | 312 | FA CA | 68 50 |
| 203 | 11001011 | CB | 313 | FA CB | 68 51 |
| VALUES OMITTED FOR BREVITY | | | | | |
| 249 | 11111001 | F9 | 371 | FA F9 | 72 57 |
| 250 | 11111010 | FA | 372 | FA FA | 73 48 |
| 251 | 11111011 | FB | 373 | FA FB | 73 49 |
| 252 | 11111100 | FC | 374 | FA FC | 73 50 |
| 253 | 11111101 | FD | 375 | FA FD | 73 51 |
| 254 | 11111110 | FE | 376 | FA FE | 73 52 |
| 255 | 11111111 | FF | 377 | FA FF | 73 53 |

FIG. 2b

| SOURCE AREA | | | | | RECEIVING AREA | | | | | | |
|---|---|---|---|---|---|---|---|---|---|---|---|
| PICTURE | STORED | LOGICAL | DISPLAY | OPERATION | PICTURE | STORED | LOGICAL | DISPLAY | "Y" STORED BINARY | "Y" STORED OCTAL | "Y" STORED HEX |
| PIC 99 | 97 | 97 | 97 | MOVE | PIC YY | 97 | 1997 | 97 | 01100001 | 141 | 61 |
| PIC 99 | 97 | 97 | 97 | ADD 25 | PIC YY | 122 | 2022 | 22 | 01111010 | 172 | 7A |
| PIC 9(4) | 2057 | 2057 | 2057 | MOVE | PIC YY | 157 | 2057 | 57 | 10011101 | 235 | 9D |
| PIC999 | 123 | 123 | 123 | MOVE | PIC YY | 223 | 2123 | 123 | 11011111 | 337 | DF |
| PIC XX | "75" | 75 | 75 | MOVE | PIC YY | 75 | 1975 | 75 | 01001011 | 113 | 4B |
| PIC XX | HEX'9B' | "??" | "??" | MOVE | PIC YY | 155 | 2055 | 55 | 10011011 | 233 | 9B |
| PIC YY | 255 | 2155 | 55 | MOVE | PIC 99 | 55 | 55 | 55 | 11111111 | 377 | FF |
| PIC YY | 122 | 2022 | 22 | MOVE | PIC 9(4) | 2022 | 2022 | 2020 | 01111010 | 172 | 7A |
| PIC YY | 202 | 2102 | 2 | MOVE | PIC 999 | 102 | 102 | 102 | 11001010 | 312 | CA |
| PIC YY | 100 | 2000 | 0 | MOVE | PIC XX | HEX'64' | "??" | "??" | 01100100 | 144 | 64 |
| PIC YY | 137 | 2037 | 37 | MOVE | PIC YY | 137 | 2037 | 37 | 10001001 | 211 | 89 |
| PIC 9(6) | 960613 | 960613 | 960613 | MOVE | PIC YY9(4) | 960613 | 19960613 | 960613 | 01000000 | 140 | 60 |
| PIC 9(8) | 20171225 | 20171225 | 20171225 | MOVE | PIC YY9(4) | (117)1225 | 20171225 | 171225 | 01110101 | 165 | 75 |
| PIC 9(8) | 10212051 | 10212051 | 10212051 | MOVE | PIC 9(4)YY | 10211(51) | 10212051 | 102151 | 10010111 | 227 | 97 |
| PIC 9(4)YY | 1103(2224) | 110324 | 110324 | MOVE | PIC 9(6) | 110324 | 110324 | 110324 | 11100000 | 340 | E0 |
| PIC 9(4)YY | 1103(2224) | 11032124 | | MOVE | PIC 9(8) | 11032124 | 11032124 | 11032124 | 11100000 | 340 | E0 |

FIG. 3

APPARATUS AND METHOD FOR REVISING COMPUTER PROGRAM CODE

FIELD OF THE INVENTION

The invention herein relates to apparatus and methods for revising existing computer program code.

BACKGROUND OF THE INVENTION

The Year 2000 problem has been well documented for nearly two decades. Much of the existing business software was not designed to anticipate, and function during, the transition to the 21st century. Early in the dawn of the computer era, storage was at a premium and, as a consequence, two positions were rarely "wasted" by storing the number of the present century. Few programmers realized then that these early programs, and their descendants, would survive until the Year 2000.

Although the cause of the problem seems simple—the software only allows for two-digit years—the solutions currently available are anything but simple, and the implications of failure can be enormous. Certain industries, including banking, insurance, and health care, are particularly sensitive to dates. According to industry sources, the projected cumulative costs for most corporations to correct the problem falls into a range of $4 to $40 million dollars per corporation. Effort projections can be equally alarming. Some estimate that the total costs related to the "Year 2000 Problem" will be nearly $600 billion.

According to some experts, those who wait until 1998 to start the repair work will only succeed in correcting 60% of the problems. Companies may suffer irreparable damage. Although there are programs in place to provide services to help clients redevelop their application portfolios, there is a considerable risk that the available collective resources will not suffice.

Some solutions attempt to expand a two-digit year field to four digits. This simple change can introduce a host of associated problems such as: (1) file expansion, requiring additional storage, truncation, misalignment, performance impacts; (2) multi-system integration, introducing the necessity of coordinating changes across all systems that have interfaces or share files; (3) redevelopment timing, whenever systems changes will need to be synchronized to the change of century; (4) transitional logic, in which extra logic is needed to bridge between changed and unchanged applications; (5) timing logic, in which extra logic will be needed to handle the timing of switching to the Year 2000 changes.

Because of the effort involved in the year field expansion approach, other techniques employ procedural "workarounds" to the problem. One technique involves logic that assumes that the century has changed if the year value falls into a specified range. However, not only does this approach tend to work for a limited time, it typically must be conditioned to the context of the specific date field. Dependencies often exist between databases, programs, procedures, and libraries, which must be identified and corrected. Accommodations also should be made for other problems such as sort logic, table searches, key matches, etc. Such approaches may introduce extra logic that is difficult to understand and, consequently, to maintain.

Ideally, a solution to help with this problem would reduce the overall effort required by reducing or eliminating many of these associated difficulties that are now being encountered.

What is needed then is apparatus, methods, and a computer program product for revising a field in computer program code that effects the change within the constraints imposed by a storage attribute. Furthermore, there is a need for intelligent code revision in which the effects of a particular code revision upon other portions of the code are identified and analyzed. If additional changes are indicated then the other revisions are made. Such apparatus, methods, and product would be particularly useful in resolving certain facets of the "Year 2000" problem in that existing code can be analyzed and revised to obviate code failures induced by the advent of the new millenium.

SUMMARY OF THE INVENTION

The invention herein provides apparatus and methods for revising a field in computer program code. One method includes the steps of analyzing program code lines for the presence of the field therein and, if present, revising the field from the first value range to a second value range. The field has a storage attribute of n bits, where n is at least eight bits; with the first value range being inclusively between zero and 99, and the second value range being inclusively between zero and $2^n-1$.

The method can further include inserting an extended field representative of a base value into the program code, with the field being encoded as an offset value relative to the extended field. It is preferred that the method includes selectively revising the storage attribute, responsive to a potential collateral effect upon execution of the computer program resulting from revising the first field. The method also can include creating a program code executable on a computer from the revised computer program code.

Another method embodied herein includes reading the source file into a source translator, analyzing one of the host language statements for the presence of the preselected data type using the source translator; and, if the data type is detected, then selectively modifying the preselected data type from a first storage attribute value range to a second storage attribute value range. The source translator can be a code interpreter, a debugger, a code emulator, or a compiler. This method can further include analyzing the effect of the revision on other host language statements and modifying selected statements in response to collateral effects of the revision upon the other statements. The storage attribute of the data is n bits, where n is at least eight bits, the first value range is inclusively between zero and 99, and the second value range is inclusively between zero and $2^n-1$. This method also can include inserting a host language statement having a base year data type representative of a base year into the source file with the preselected data type being revised to represent an offset value relative to the base year.

The present invention also provides a system for revising a computer program file having multiple host language statements, including an analyzer, for identifying a preselected data type in the host language statements, and a translator for selectively modifying the preselected data type from the first attribute value range to a second attribute value range. The system can include input means to read the program file and provide the program file to the analyzer, and output means to store the modified program file on a computer-readable medium. The system also can include compiling means for generating code executable on a computer system from the modified program code. The analyzer can act as a code interaction analyzer for identifying other host language statements requiring modification by the translator in response to the selective modification of the preselected data type. The translator, alone or in combination with the analyzer, can be a code interpreter, a debugger, a code emulator, or a compiler.

The invention also includes an improved translator including a programmed processor for translating code of a computer program for execution by a processor including identification means to identify a first preselected data field within the computer program; and a first conversion means to convert the first preselected data field having a first predetermined value range to a second preselected data field having a second predetermined value range. The translator also can include analysis means to predict a potential collateral effect resulting from a data field conversion by the first conversion means; and a second conversion means to selectively convert portions of source code responsive to the potential collateral effect. The translator can be a code interpreter, a debugger, a code emulator, or a compiler.

The invention also includes a computer program product for revising a first preselected data field in a computer program file having a plurality of host language statements, including a computer-readable recording medium; identification means, recorded on the recording medium, to identify the first preselected data field within the computer program file; and first conversion means to convert the first preselected data field having the first predetermined value range to a second preselected data field having a second predetermined value range, the second predetermined value range conforming to a storage attribute of and being generally larger than the first predetermined value range. The product also can include analysis means to predict a potential collateral effect resulting from a data field conversion by the first conversion means; and second conversion means to selectively convert program code responsive to the potential collateral effect. The computer program product can include a translator having the identification means and first conversion means therein, with the translator being a code interpreter, a debugger, a code emulator, or a compiler.

BRIEF DESCRIPTION OF THE DRAWINGS

FIG. 1 is an exemplary data structure depicting the form and usage of the extended syntax computer COBOL code according to the invention herein.

FIG. 2a is a tabular representation of coding for exemplary data fields using extended syntax coding for a value range inclusively between 0 and 99.

FIG. 2b is a tabular representation of coding for exemplary data fields using extended syntax coding for a value range inclusively between 0 and 255.

FIG. 3 is a tabular representation illustrating selected exemplary COBOL rules that can be used to convert a data field having a first data type to a data field having a second data type.

DETAILED DESCRIPTION OF THE EMBODIMENTS

Figure 4:
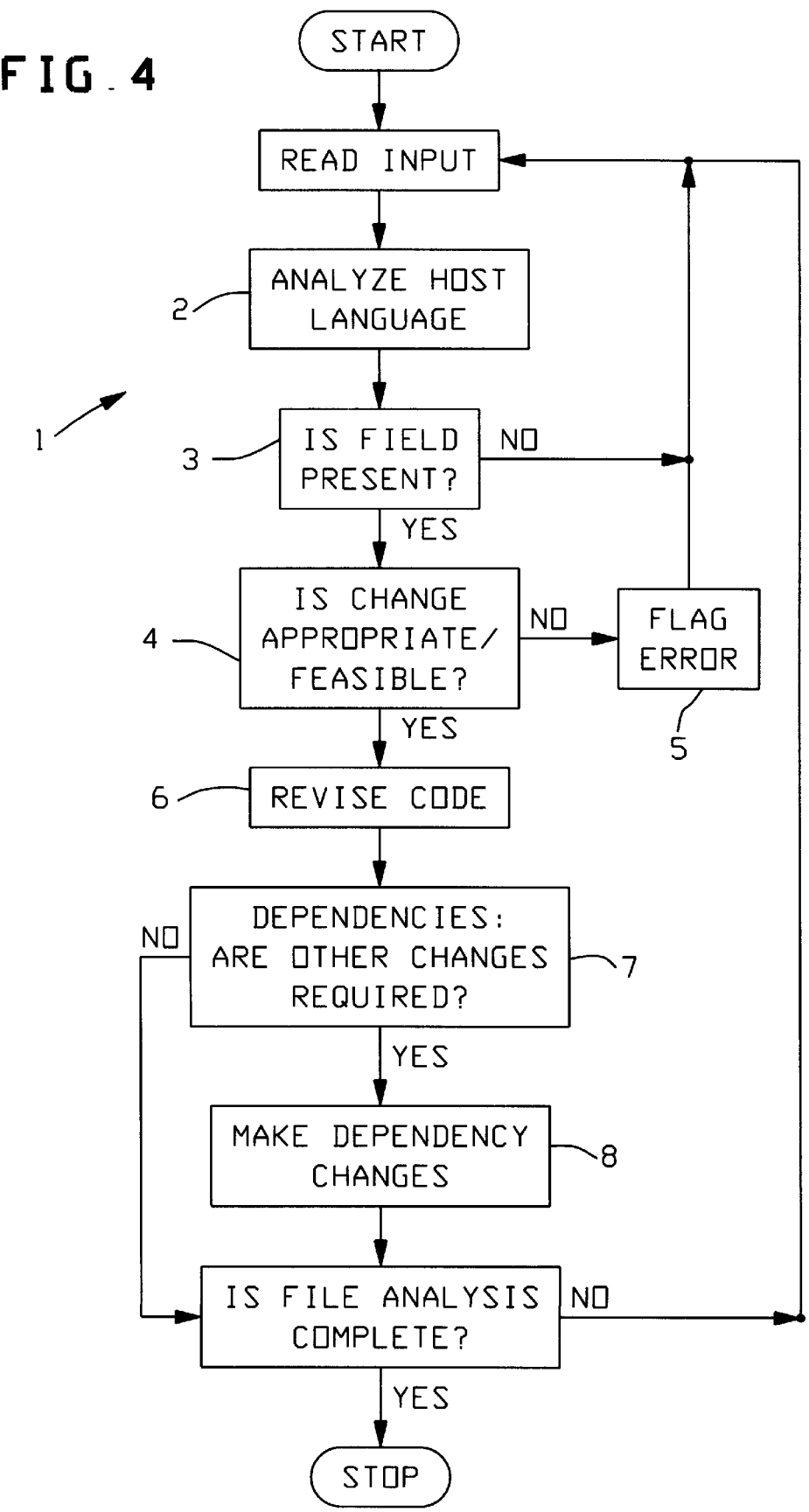
FIG. 4 is a flow chart of one embodiment of a method according to the present invention.

The invention described and embodied herein provides apparatus and methods for revising an existing computer program in which it is desired to alter preselected fields, preferably data fields, and most preferably two-digit-year date fields, within the program. The apparatus can include, and the methods can be implemented in, one of a code interpreter, a debugger, a code emulator, and a compiler.

Also provided is a computer program product that is recorded on a computer-readable medium, the product containing executable computer instructions to realize certain embodiments of the disclosed invention in a computer system. The computer program product can contain a translator which can be a code interpreter, a debugger, a code emulator, or a compiler.

In a preferred embodiment, the apparatus and method effect intelligent source code revision, in that the impact of a proposed source code change is analyzed for potential collateral effects on other portions of the source code syntax and logic. Additional changes to the program source code may be made, responsive to the revision. This feature is particularly useful, for example, where the affected code is a date field that is embedded throughout multiple lines of computer code, including code for screen and report generators.

The code change to a host language statement may involve the conversion of a data field from a first data type to a second data type. The second data type can permit a broader range of data values, e.g., a larger range of years may be represented, while conforming to the information capacity exacted by existing storage or format requirements, e.g., eight bits of storage for each of the year indicia. Such a change can be implemented, for example, by adding a new data type to the host programming language data types, and substituting the new data type for the original data type during program compilation. In one embodiment, such changes also may be made on-the-fly during program execution, for example, with a code interpreter.

In addition, the code change may include the addition of a new host language statement to the code to further amplify the meaning intended by the data field conversion. As an example, a "base year" could be added to the programming language syntax, and inserted into the host language source code to provide a composite date entity (i.e., base year+ offset year) having a larger information capacity relative to a two-digit date field.

For the purpose of clarity, the embodiments of the invention herein are described in terms of date field revisions, specifically two-digit year field revisions, in the COBOL programming environment. A skilled artisan would realize that preselected codes other than date fields can be modified, and that programming languages, and the like, other than COBOL, can be revised using the teachings herein to effect the desired code revision.

By way of background, existing two-digit year fields cannot contain values that exceed 99, although many common data coding technique variations use at least four bits for each digit. Because two digits are typically used, at least eight bits are available to represent a value of interest. In decimal terms, the range of values that can be represented with n bits is inclusively between 0 (zero, or all bits OFF) to $2^n-1$ (all bits ON). With n equal to eight bits, this range cannot physically accommodate four-digit year values. However, the embodiments of present invention, including certain compiler enhancements, can allow the executed code to impart scalar logic to these same ($2^n-1$) bits. This scalar logic can use the extended scalar values in combination with a referenced value, e.g., a base century, to represent a four-digit year value within the logic of the program. Even though the stored number is simply a value representing the number of years to be added to some base century value, the enhancement would yield a value that would be equivalent to a logical four-digit year number.

For example, a two-digit year field containing the value 76 could represent the value 1976, if the base century is set to 1900. For the same base century (1900), an extended two-digit field using the existing higher-order bits can physically hold a value, such as 151, which would represent the value 2051 by adding 151 to 1900. The value of a base century also can be set to zero to allow fields to behave in a manner that is functionally equivalent to the original logic, until it is appropriate to "switch over" to the extended-range scalar logic.

Although the storage attribute corresponding to the field type is described in terms of a two-digit field type or an eight-bit storage quantum, a skilled artisan would recognize that other field type and storage attribute scenarios are also accommodated by teachings herein. For the instance where the two-digit year field is embedded in a six-digit numeric field, e.g., 090596 (Sep. 5, 1996), the invention herein can be used to identify and revise that portion of the six-digit numeric field that corresponds to the two-digit year field. Therefore, as used herein the term field is intended to comprehend complete fields, and any relevant field portions thereof.

Also, many coding schemes use more than eight bits of storage per field. These schemes often ignore, or inefficiently use, the extra, typically higher-order, bits of the field. The present invention can be used to take advantage of these higher-order bits by extending the value range of the field. Where n is the number of bits available per field, the largest value that can be represented by scalar re-encoding according to the present invention can be $(2^n-1)$, e.g., a 10-bit field car be revised using scalar re-encoding to provide a value range inclusively between zero and 1023. However, the present invention does not require all n bits be used to effect scalar encoding. Other re-encoding schemes also may be used within the teachings of the present invention. For example, certain unused higher-order bits may be used to represent a base century. Combinations of the coding scheme variants also may be used.

It is preferred that specialized logic or heuristics be used to govern the compiler behavior that is needed to translate values to and from traditional two-digit year fields. Typically, many screens and reports do not have the space to accommodate additional characters. It may be acceptable to continue representing the year in a two-digit fashion, provided that the end-user can interpret the actual year from its context, and provided that the system can be made (for example, via the specification of a base century) to "understand" the context as well. In one embodiment, it is preferred to use "specialized" bits that would indicate which base century is indicated for the field.

FIG. 1 illustrates an embodiment of the present invention in the context and syntax of a data structure in the COBOL programming language. In FIG. 1, (1) a new PICTURE character ("Y") is used instead of "9"; and (2) a new syntax (e.g., BASE-CENTURY IS <data-name>) is added to set the value that is to be added to the "stored" scalar year from which to calculate the "logical" scalar year value. It is preferred that the USAGE attributes of the scalar year fields, i.e., PIC YY, function in a manner consistent with what is done for a standard numeric field, e.g., PIC 99.

It is preferred that when stored values exceed 99, the mechanism used should employ higher-order bits in the data field in a consistent fashion. It is particularly preferred that a logically-correct collation or sorting sequence be maintained for data fields, relative to the values that they are intended to contain. That is, the stored coding is preferred to produce essentially the same sequence as would the logical values they represent, assuming the same base century spans all of the affected records. Treatment of scalar year fields (i.e., PIC YY fields) are preferred to be the same as with that of numeric fields (e.g., PIC 99), with the exception of the special rules that will apply to the transformation and the editing of values moving to and from the scalar year fields. In essence, the method herein allows a software developer to store a value that will logically represent a four-digit year in the same storage space (as defined by the storage attribute) as currently occupied by a two-digit year field.

For example, a new PICTURE data type, i.e., PIC YY, can be used to expand value range of the data field represented variable RD-YEAR. Because the PIC YY data type retains the n-bit storage attribute that was used by the data type PIC 99, the logical value range for data field RD-YEAR when converted to data type PIC YY, can be expanded to be between zero and $2^n-1$ years. Also, it may be desirable to provide one or more reference structures to further define the context of the converted data field. As seen in FIG. 1, such structural elements including THIS-CENTURY, NEXT-CENTURY, and NO-CENTURY, can be inserted into the host language source code to provide the desired reference points.

The present invention can be implemented as enhancements to existing compilers and associated software including database definition facilities, screen designers, etc. For a particular implementation such as a compiler, specific changes to compiler syntax, editing logic, and code generation logic may be necessary. The invention also can be implemented as new programming and application tools, including source code translators, compilers, code interpreters, debuggers, code emulators, and code conversion systems. The skilled artisan would recognize that variations of the disclosed apparatus and methods also would provide scalar values that span at least two centuries.

FIG. 2*a* illustrates the coding that is typically used for traditional value ranges between 0 (zero) and 99, inclusive. It is preferred that the new syntax (e.g., PIC YY) handle storage for the values in this range in the same fashion as a standard numeric field (e.g., PIC 99). For brevity, values between 6 and 94 have been omitted.

Unlike the coding in FIG. 2*a*, which reaches the maximum range value at 99, the extended capabilities of the new PIC YY data type are apparent in FIG. 2*b*. Also for brevity, values between 103 and 199, and 203 and 249 have been omitted. Note that in the EBCDIC and ASCII display coding in FIG. 2*b*, the sort sequence is preserved, as is preferred.

FIG. 3 illustrates exemplary rules that may be implemented in an source translator, such as an interpreter or a COBOL compiler, to govern the desired editing and/or translations. In this example, a COBOL compiler according to the present invention could edit the calculated scalar yield fields to transform the logical four-digit year into edited and stored formats, depending on whether the source or the destination is a two- or four-digit numeric, alphanumeric, or edited numeric fields.

FIG. 4 illustrates one preferred method for revising a field in the program code lines of a computer program according to the invention herein. Method 1 includes analyzing program code lines for the presence of a data field (step 2). The data field is a first data type having a storage attribute (e.g., eight bits) and a first value range (e.g., 0 to 99) associated therewith. If the data field is present (step 3), the method continues by revising the data field to a second data type (step 6). The second data type is preferred to have a storage attribute identical to the first data type but with a second value range (e.g., zero to $2^n-1$) associated therewith. It is preferred that the second value range be greater than the first value range.

It also may be preferred to intelligently revise the code by first determining whether the code change is feasible or desirable (step 4). If the change is not feasible or desirable, the line of program code is so identified, or flagged (step 5), and the analysis continues. On the other hand, if the change is desirable or feasible, the code revision is made (step 6), as above. The change may include a revision to one or more data fields, control logic entities, etc., or the addition of one or more new host language program code lines which extend the logical interpretation of the field. An example of this logical extension is presented above in FIG. 1, using syntax extensions such as BASE YEAR IS, and the like, to provide (base+offset) functionality to the data field.

Furthermore, intelligent revision of the code can include analyzing other lines of the program code to determine whether additional dependency-related changes to the other lines of program code need to be made, responsive to the aforementioned code change (step 7). If such changes are indicated (e.g., to formatted output fields, database fields, etc., then those changes are also implemented (step 8). Method 1 typically continues until all input code has been analyzed.

Figure 5:
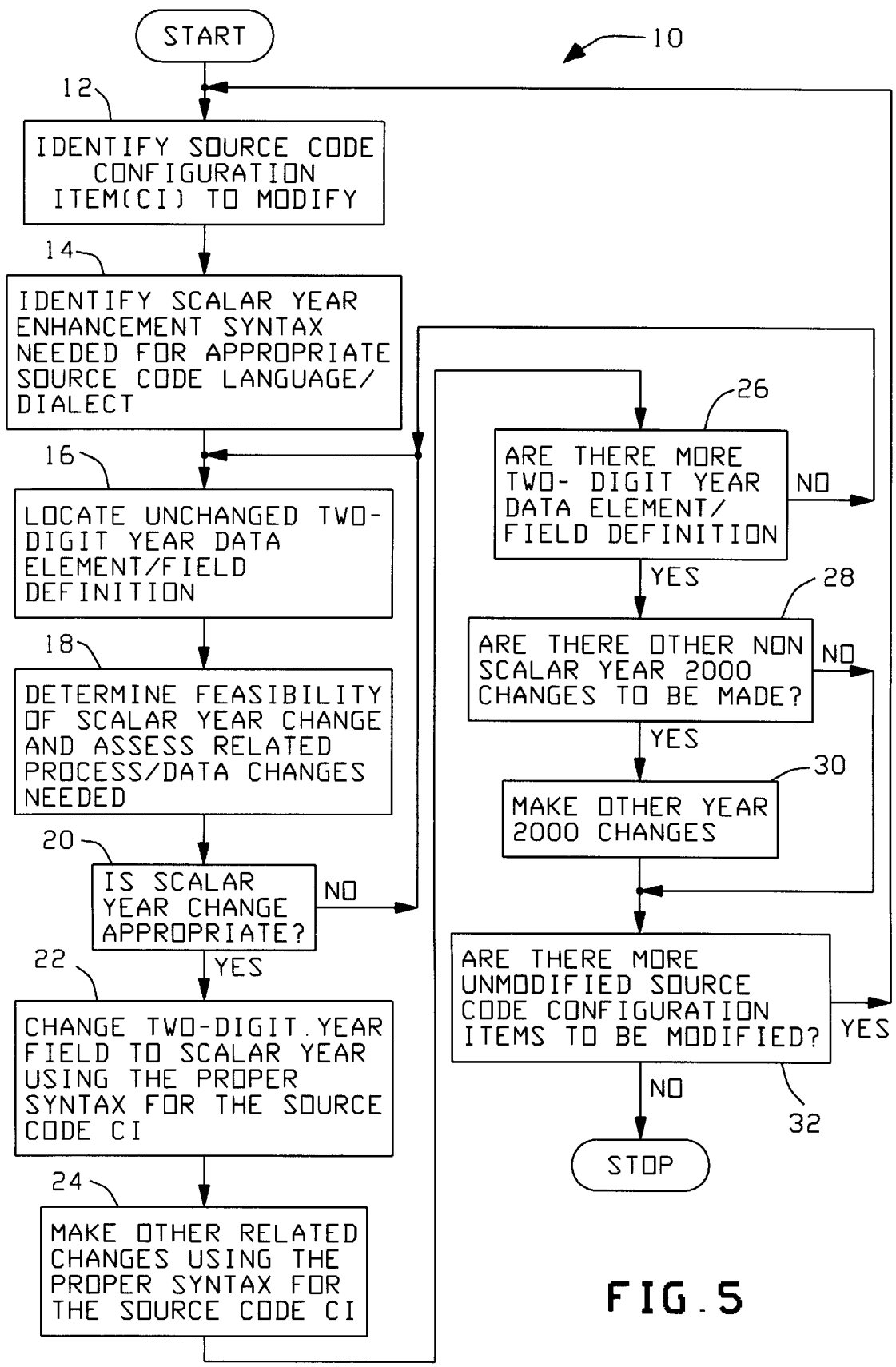
FIG. 5 is a flow chart of another embodiment of a method according to the present invention.

FIG. 5 illustrates another embodiment of the invention herein. In particular, method 10 begins with identifying the source code configuration item (CI) to be modified (step 12). As defined herein a CI is a programmable element that contains data definitions which itself can have programmable processing logic, data elements, or fields (each a "quantum" as defined herein). A CI may be, for example, a database definition file, program source code, or other files relevant to the source code file, such as a COBOL program COPY file. Once the CI has been identified, method 10 continues by identifying the appropriate enhancement that is to be made to the CI (step 14). It is preferred that a proposed syntax revision be appropriate for the particular source code language or dialect thereof. Method 10 continues by locating the desired unchanged quantum, e.g., a two-digit year data element or field definition (step 16).

Method 10 also is most preferred to be an intelligent revision method, which is implemented by determining the feasibility of the proposed change in the contexts of the change itself and of the potential collateral effects upon other quanta (steps 18 and 20). If such change is determined to be feasible and appropriate, then method 10 continues by revising the quantum from the first data type to the second data type using syntax which is proper for the host language (step 22). Similarly, if additional dependency-related revisions to other quanta, or CI, are indicated, then those revisions also may be implemented (step 24). Steps 12–24 are preferred to occur iteratively until all of the quanta, and CI, under analysis has been processed (steps 28–32).

Figure 6:
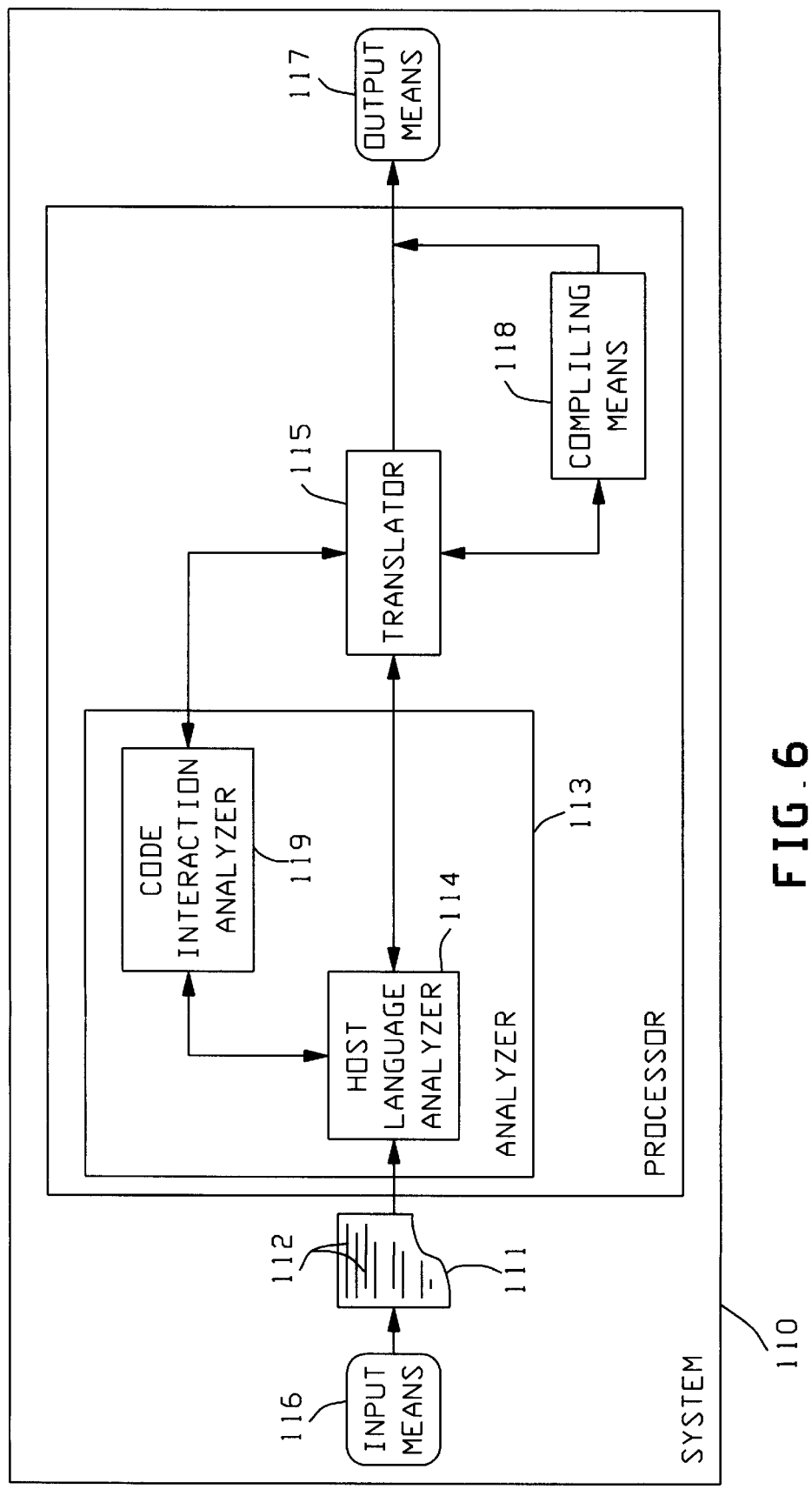
FIG. 6 is one embodiment of an apparatus, a system, according to the present invention.

FIG. 6 is one embodiment of an apparatus, system 110, according to the present invention. In system 110, a program code file 111 having host language statements 112 is input to analyzer 113. Analyzer 113 can include a host language analyzer which identifies a preselected program element within the relevant ones of statements 112 that has a storage attribute (e.g., n-bits) and a first storage attribute value range (e.g., zero to 99). Once the preselected program elements are identified, they are conveyed to translator 115 for selectively modifying the program element from the first attribute value range to a second attribute value range (e.g., zero to 255, for n equals eight bits), thus creating a modified code file.

System 110 also may include input means 116 to read code file 111 and provide code file 111 to analyzer 113; and output means 117 to store the modified code file on a computer-readable medium. Compiling means 118 also may be included in system 110 for generating code executable on a computer from the modified code file. It is preferred to provide intelligent revision of the program code by including in analyzer 113, a code interaction analyzer 119. Analyzer 119 identifies other lines of program code that are dependent upon the program element that is to be modified, and potential collateral effects on other program elements, and on program execution, can be examined. If analyzer 119 determines that these dependency-related changes are feasible and desirable, translator 115 can be instructed to revise the dependency-related program code, responsive to the selective modification of the program element.

Figure 7:
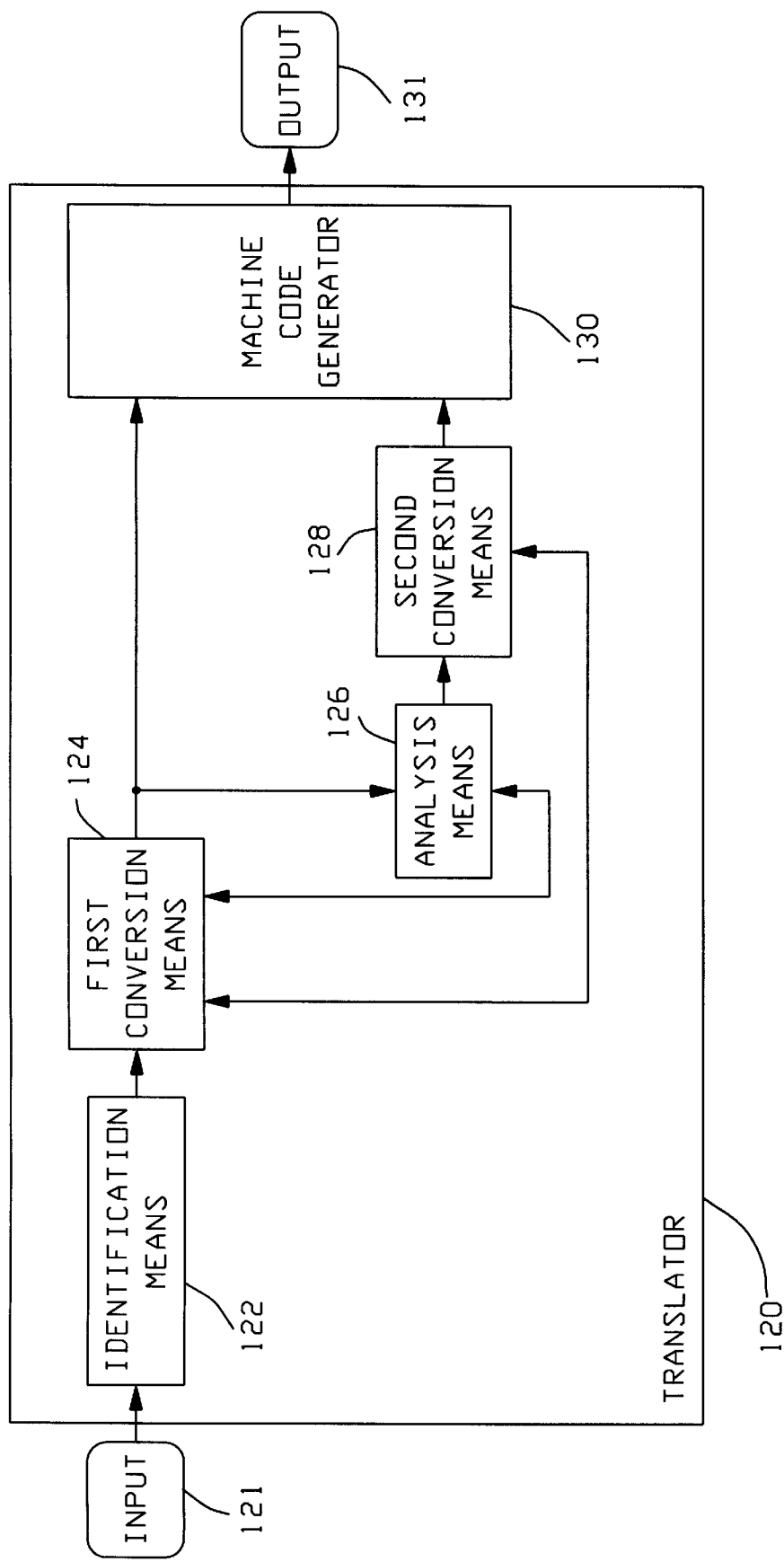
FIG. 7 is another embodiment of an apparatus, a compiler, enhanced according to the present invention.

In addition to the apparatus and methods described above, the present invention also may be embodied in an enhanced compiler 120, as seen in FIG. 7. Compiler 120 can be a programmed processor for compiling the source code of an uncompiled computer program which is stored upon, and received from, input device 121. Identification means 122 can identify one or more first preselected tokens, having a token attribute (e.g., allocated physical storage) and first token type, within the uncompiled program source code. Identification means 122 can be subsumed in a parser/syntax analyzer of compiler 120. First conversion means 124 selectively converts the predetermined tokens to a second token type having a token attribute substantially identical to the first token type. The output of first conversion means 124 can be directed first to machine code generator 130, or directly to output means 131.

In addition, the output of first conversion means 124 can be further processed by analysis means 126. Analysis means 126 can predict a potential collateral effect resulting from the token conversion in first conversion means 124. Analysis means 126 examines the source code, for example, to identify other tokens throughout the source code which may be affected by a particular token conversion. Second conversion means 128 effects conversion for the tokens in danger of suffering a deleterious collateral effect from the previous token conversion. The output of means 128 can be directed first to machine code generator 130, or directly to output means 131.

Of course, a skilled artisan would realized that there is no requirement that the conversion means 124, 128, be completely separate entities but also may be an integrated compiler component with integral functionality. Similarly, means 122 and 126 also may be combined functionally.

While the invention has been described with respect to particular embodiments above, it will be understood by those skilled in the art that modifications may be made without departing from the spirit and scope of the present invention. These examples are for purposes of example and illustration only and are not to be taken to limit the scope of the invention narrower than the scope of the appended claims.

I claim:

1. A method for revising a two-digit data field in a computer application program of the type associated with a plurality of program code lines on a computer readable medium, the method comprising the steps of:

a. analyzing the plurality of program code lines for the presence of the two-digit data field therein, said field being of a type having a base year 1900 attribute and a first value range of 0 through 99 associated with the base year;

b. identifying the lines of the program code that are operable with the application program without modification, c. identifying the lines of the program code that are not operable if extended beyond the year 2000, d. determining if it is feasible to substitute a scalar year for the two-digit data field and said first value range of 0 through 99, e. accessing related process/data changes needed to substitute a scalar year for the two-digit year field, f. generating a scalar year using the combined binary bits allotted for the two-digit data field in the program code, g. generating a base year to be added to the scalar year, h. modifying the data fields of the program code and the base year in the application program to provide a new machine readable year date beyond the year 2000, and i. providing a partially revised computer readable program code.

2. The method of claim 1 further comprising the step of modifying bits of said scalar year to provide an extended field representative of a base year value in the computer readable program code, so that the two-digit data field being encoded as a scalar value is an offset value relative to the extended field.

3. The method of claim 1 further comprising the step of inserting binary bits representative of a base year in the data field of the computer readable program code, the scalar year data field being encoded as an offset relative to the base year data field.

4. The method of claim 1 wherein the step of modifying the data fields of the computer readable program code creates lines of code executable on a computer readable medium as a revised computer readable program code.

5. An improved apparatus including a programmed processor for compiling source code of an uncompiled computer program for execution by a processor, the uncompiled computer program having a first preselected data field having a storage attribute with a first predetermined value range, the programmed processor comprising:

a. identification means to identify the first preselected data field within the uncompiled computer program;

b. first conversion means coupled to said identification means to convert the first preselected data field having the first predetermined value range to a second preselected data field having a second predetermined value range, the second predetermined value range conforming to the storage attribute and being generally larger than the first predetermined value range;

c. said storage attribute comprises at least eight bits;

d. said first preselected data field comprises a two-digit year field having a first predetermined value range of inclusively between zero and 99, e. said second preselected data field comprises a scalar year field having a second predetermined value range of inclusively between zero and $2^n-1$;

f. analysis means to predict a potential collateral effect resulting from a data field conversion by the first conversion means;

g. second conversion means to selectively convert portions of source code responsive to the potential collateral effect, and wherein:

h. at least one of the first and second conversion means convert the first preselected data field to a second preselected data field and further insert into the source code a preselected third data field relative to the second preselected data field.

6. The improved compiler of claim 5 wherein the second preselected data field is a scalar offset year and the third preselected data field is a scalar base year.

7. An improved translator including a programmed processor for translating code of a computer program for execution by a processor, the computer program having a first preselected data field having a storage attribute with a first predetermined value range, the programmed processor comprising:

a. identification means to identify the first preselected data field within the computer program;

b. first conversion means coupled to said identification means to convert the first preselected data field having the first predetermined value range to a second preselected data field having a second predetermined value range, the second predetermined value range conforming to the storage attribute and being generally larger than the first predetermined value range;

c. said identification means and first conversion means comprise of a code interpreter, a debugger, a code emulator, and a compiler;

d. analysis means to predict a potential collateral effect resulting from a data field conversion by the first conversion means;

e. second conversion means to selectively convert portions of source code responsive to the potential collateral effect; and wherein:

f. at least one of the first and second conversion means convert the first preselected field to a second preselected field and further insert into the code a third preselected field relative to the second preselected field.

8. The improved translator of claim 7 wherein the storage attribute comprises up to sixteen bits, the first preselected data field is a two-digit year field having a first predetermined value range of years inclusively between zero and 99, and the second preselected data field is a scalar year field having a second predetermined value range of years inclusively up to $2^{16}$.

9. The improved translator of claim 7 wherein the second preselected field is a scalar offset year and the third preselected field is a scalar base year.

10. A computer program product for revising a first preselected data field in a computer program file, the file having a plurality of host language statements, the first preselected data field having a storage attribute and a first value range conforming with the storage attribute, the computer program product being for use with a system for revising the computer applications program, the computer program product comprising:

a. a computer-readable recording medium;

b. identification means to identify the first preselected data field within the computer program file, the identification means being recorded on the recording medium;

c. first conversion means being coupled to the identification means and being recorded on the recording medium for converting the first preselected data field having a first predetermined value range to a second preselected data field having a second predetermined value range, the second predetermined value range conforming to the storage attribute and being generally larger than the first predetermined value range, d. analysis means to predict a potential collateral effect resulting from a data field conversion by the first conversion means;

e. second conversion means to selectively convert program code responsive to the potential collateral effect;

f. at least one of the first and second conversion means for converting the first preselected field to a second preselected field and inserting into the program code a preselected third data field relative to the second preselected field, and wherein:

g. said storage attribute comprises at least eight bits;

h. said first preselected field comprises a two-digit year field having a first predetermined value range of inclusively between zero and 99; and i. said second preselected field comprises a scalar year field having a second predetermined value range of inclusively between zero and $2^n-1$.

11. The computer program product of claim 10 wherein the second preselected field is a scalar offset year and the third preselected field is a scalar base year.

12. The computer program product of claim 10 including a translator having the identification means and first conversion means therein, and the translator is one of a code interpreter, a debugger, a code emulator, and a compiler.

* * * * *